United States Patent
Wolff et al.

[15] 3,659,060
[45] Apr. 25, 1972

[54] SYSTEM FOR MEASURING FREQUENCY DEVIATION

[72] Inventors: Allan L. Wolff, 2485 Huntington Drive, San Marino, Calif. 91108; David Ferber, 17139 Bullock Street, Encino, Calif. 91316

[22] Filed: Apr. 8, 1970

[21] Appl. No.: 26,643

[52] U.S. Cl. ................179/100.2 K, 324/57 A, 324/77 A, 325/148, 332/19
[51] Int. Cl. .................................................H03c 3/06
[58] Field of Search ..........179/1 VS, 100.2 K; 332/18, 332/19, 20; 325/46, 134, 147, 148; 324/57 A, 77 A; 340/181; 330/9

[56] References Cited

UNITED STATES PATENTS

| | | | |
|---|---|---|---|
| 2,484,586 | 10/1949 | Race | 332/20 |
| 3,238,456 | 3/1966 | Greefkes | 332/18 X |
| 3,200,899 | 8/1965 | Krauss | 179/1 VS X |
| 2,753,526 | 7/1956 | Ketchledge | 179/100.2 K UX |

*Primary Examiner*—Alfred L. Brody
*Attorney*—Nilsson, Robbins, Wills & Berliner

[57] ABSTRACT

A monitoring system for use in combination with a frequency modulation apparatus is disclosed, whereby occurrences of over modulation may be controlled. Manual control may be exercised, or the system may include a servo loop to accomplish automatic modulation control. In the system a frequency-modulated intelligence signal is detected to provide an amplitude-varying signal which is applied to an amplitude threshold unit that functions to signal when the input amplitude exceeds a predetermined level. The system is disclosed to provide a humanly-perceivable signal and additionally to include a loop to automatically control the degree of modulation.

4 Claims, 4 Drawing Figures

INVENTOR.
ALLAN L. WOLFF
DAVID FERBER
BY
Nilsson, Robbins, Wills & Berliner
Attorneys.

SYSTEM FOR MEASURING FREQUENCY DEVIATION

BACKGROUND AND SUMMARY OF THE INVENTION

Frequency modulation is a technique that is in widespread use to represent various forms of intelligence with an electrical signal. In general, the instantaneous frequency of a signal is varied to depart from a basic or carrier frequency by an amount proportional to the instantaneous amplitude of a modulating wave at the rate that the modulating wave is varied. Such frequency-modulated signals may then be variously utilized as to transmit intelligence or to record the intelligence.

In most systems embodying frequency modulation, the FM signal is eventually converted back into an amplitude varying form by a frequency detector. Generally, the relationship of the original signal to the detected signal is precise only within certain limits of amplitude. That is, if the modulating wave is of an amplitude to over drive the frequency modulator, non-linear signals will be produced. Exceeding the permissable frequency deviation limit by over driving the modulator overmodulates the intelligence with the result that when the FM signal is detected the resulting signal is distorted from the original intelligence signal. Accordingly, it is important to maintain the modulation within the allowable deviation limits.

Generally, the techniques of frequency modulation are closely related to those of phase modulation and in that regard the system hereof is fully applicable to a phase modulation system. In that regard, the terms "frequency modulation" as used herein encompass phase modulation.

In relatively-recent years magnetic recording techniques have become increasingly popular in conjunction with frequency-modulated signals. Specifically, for example, physiological data, as waveforms indicative of human heart rates have been effectively recorded on magnetic tape by the use of frequency-modulation techniques. These signals have thus been preserved for future analysis and study. In general, signals representative of physiological data may vary widely and may be exceedingly complex. Accordingly, such signals are sometimes difficult to record and accurately reproduce. Yet, in view of the relationship of such data to human life, a high degree of accuracy is frequently very important. To facilitate and enable widespread use of such systems, a considerable need exists for improvements that are economical and accurate.

One of the difficulties involved in relatively-economical magnetic recording systems which utilize frequency-modulation techniques, has been the avoidance of over modulation. One technique that has been employed involves rectification of the detected intelligence signal for application to a meter that manifests the degree of modulation. Although such an arrangement is effective in some applications to provide an operator with control information, it is not particularly satisfactory in the area of physiological data recording. The reason is that the meter involved in such an arrangement is generally affected to a substantial degree by the nature of the metered waveform. In the field of physiological recording, wherein widely divergent waveforms are routine, it is exceedingly difficult to provide reliable modulation information for control purposes, with the metering technique as described above. Accordingly, a considerable need exists for a simple and economical system for manifesting the occurrence of over modulation in an FM signal, which system can be utilized to control the degree of frequency modulation, as for use in recording physiological data.

The present invention, in general, is directed to a system for indicating an excessive frequency deviation in an FM system. The FM signal is formulated from a wave of amplitude-varying intelligence and may be utilized in any of a variety of apparatus. Concurrently with the modulation, the resulting FM signal is demodulated or detected to provide the original form, which signal is threshold-detected to provide a series of pulses, as for example when the carrier signal is over-modulated. The signal so provided may then be employed to drive a visual or other humanly perceivable signal or may be utilized in a feedback loop to servo the modulation within permissable limits.

BRIEF DESCRIPTION OF THE DRAWINGS

In the drawings, which constitute a part of this specification, an exemplary embodiment demonstrating various objectives and features hereof is set forth. Specifically.

DESCRIPTION OF THE ILLUSTRATIVE EMBODIMENT

Figure 1:
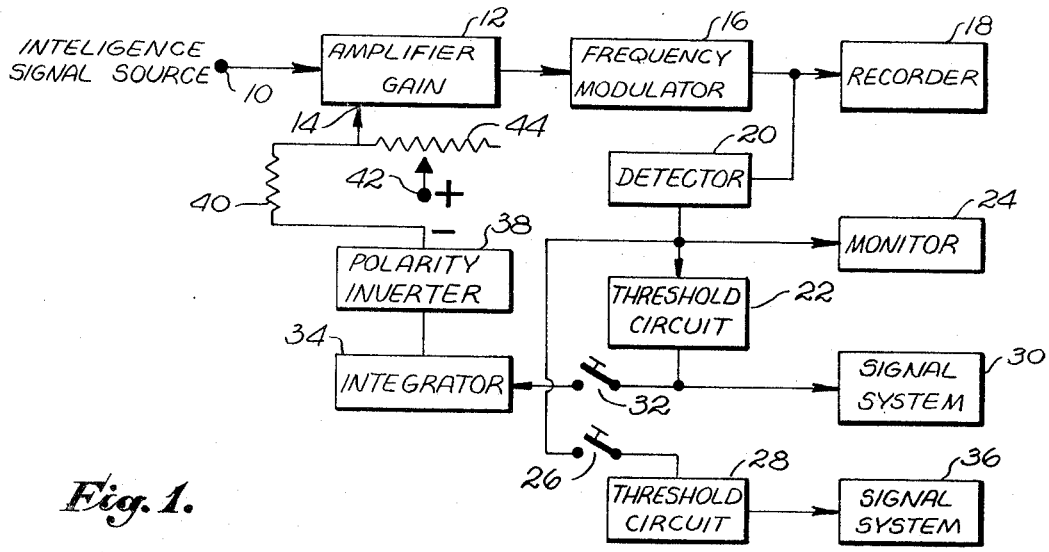
FIG. 1 is a block diagram of a system constructed in accordance with the present invention.

Referring initially to FIG. 1, there is shown a terminal 10 which is connected to receive an electrical signal as from a variety of transducers, which signal is of varying amplitude to represent intelligence. For example, in a specific application of the present system the signal that is applied to the terminal 10 may represent physiological intelligence, e.g. a waveform indicative of a human heart rate.

The terminal 10 is connected to a variable-gain amplifier 12 having a gain-control input 14. Functionally, the amplifier 12 amplifies the signal that is applied at the terminal 10 to a degree that is relative to the level of the signal applied as a gain-control at the input 14.

The output from the amplifier 12 is applied to a frequency modulator 16 which may embody structures as generally well-known in the prior art. Specifically, the modulator 16 may comprise any of a variety of modulation circuits, as for example incorporating the Crosby system of frequency modulation to provide an FM signal that is representative of the applied input signal. The FM signal from the frequency modulator 16 is applied to a recorder 18 and to a detector 20. The recorder 18 may for example comprise a magnetic-tape unit for recording the FM signal and a variety of such units are well known and are currently in widespread use. The detector 20 may comprise any of a variety of frequency discriminators, as for example a Foster-Seely circuit following any of a variety of specific designs.

The output from the detector 20 is ideally the same waveform which was applied at the input terminal 10 and generally, as long as the components described above operate within predetermined limits a relatively-close or linear relationship will exist. That is, the signal provided from the detector 20 generally coincides to the initially applied intelligence signal, providing the system operates over a linear portion of the modulation curve. More particularly, the relationship is usually quite linear, so long as the frequency modulator 16 is not over driven by the signal from the amplifier 12 to overmodulate.

The output signal from the detector 20 is applied directly to a threshold circuit 22 and a monitor 24, and indirectly through a switch 26 to another threshold circuit 28. The threshold circuits 22 and 28 may comprise various forms of trigger circuits or amplitude detectors which pass only those portions of a signal which exceed a predetermined amplitude. The threshold circuits 22 and 28 have different threshold levels. In general, if both threshold circuits 22 and 28 are used concurrently (operation with switch 26 closed) as well known in the prior art, to vary the threshold, two different levels of modulation are indicated. Also, these circuits may incorporate a variable control level and thereby vary the levels of observation.

The threshold circuit 22 is connected to a signal system 30 and through a switch 32 to an integrator circuit 34. The signal system 30 may afford a means of control by providing a humanly-perceivable signal, and may include a visual or audio device. A similar signal system 36 is connected to the threshold circuit 28. The details of exemplary forms of these systems are considered below.

The integrator 34, which receives the output from the threshold circuit 22, may comprise any of a variety of integrators or smoothing circuits, varying from a simple RC network to sophisticated forms of Miller circuits or filters. Functionally, the integrator 34 converts a series of irregular pulses into a continuous relatively smooth control signal for application through a polarity inverter 38 and a resistor 40 to the gain-control input of the amplifier 12. At the same input, the amplifier 12 also receives a signal through a variable resistor 44 from a source of positive potential that is applied at a terminal 42.

Figure 2:
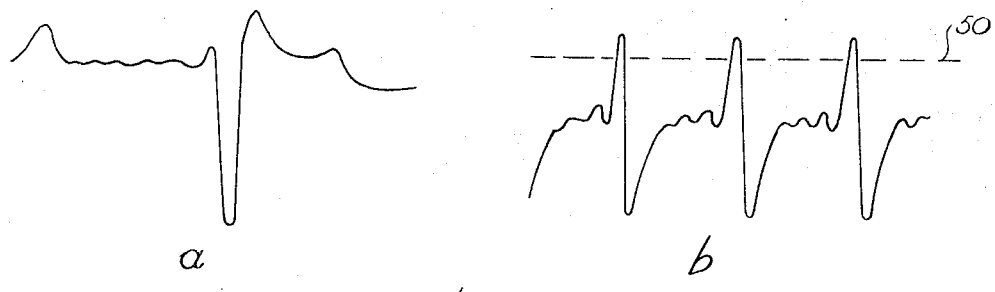
FIG. 2 is a showing of waveforms of physiological information, as may be recorded.

The operation of the system as shown in FIG. 1 may involve the application of widely divergent waveforms to the terminal 10 which are representative, for example, of physiological data. Specifically, for example, two such waveforms of signals representative of heartbeats are shown in FIGS. 2a and 2b. It is to be noted that, not only are the frequencies widely divergent between these two signals but also the patterns of the signals are very different. This variable characteristic of physiological data signals is particularly significant in considering the difficulty involved with prior techniques of rectifying such signals to drive a meter for indicating the degree of modulation.

In the operation of the system of FIG. 1, assume that a waveform substantially as represented in FIG. 2a is applied to the terminal 10 for amplification (by the amplifier 12) and frequency modulation (by the modulator 16). The FM output signal from the modulator 16 is applied to the recorder 18, the function of which is the objective of the system, i.e. to obtain a frequency-modulated recording of the physiological information represented by the applied waveform.

As described, the FM output from the modulator 16 is demodulated by the detector 20 to provide a signal that ideally coincides to the input signal. That signal is applied to the monitor 24 which may comprise for example, a cathode ray tube display device on which the demodulated waveform is visually presented. By the use of such a monitor, a picture of the recorded information is provided for consideration of the operator at the time of recording.

The demodulated waveform from the detector 20 is also applied, as indicated above, to the threshold circuit 22 which is set to coincide to the deviation limit of the modulator 16. That is, if the threshold of the threshold circuit 22 coincides to the modulation limit, the threshold circuit 22 will provide an output containing those portions of the total signal which exceed the level of the modulation limit. If for example, the waveform as depicted in FIG. 2b is being recorded and if the peaks of the waveform (above the line 50) overdrive the frequency modulator 16, overmodulation is the result. If the threshold circuit 22 is set to the level indicated by the line 50, then the peaks above the line 50 are provided as pulses from the circuit 22. These peaks energize the signal system 30 to provide a visual or audible indication. That is, as suggested above, the signal system 30 may comprise an audible or visual signal which immediately notifies an operator that the system is over modulating. Being so informed, an operator may take corrective action.

In the event the system operates in a configuration with the switch 26 closed, two threshold levels may be defined. For example, one threshold may be established at the line 50 as indicated in FIG 2b while a second threshold may be established at a somewhat higher level by the threshold circuit 28. Accordingly, actuation of the signal system 30 indicates over modulation while actuation of the signal system 30 may indicate substantial over modulation. Thus various degrees of over modulation may be indicated. In another arrangement, the threshold circuit 28 may be set to indicate a level of normal or linear modulation while the threshold circuit 22 again indicates excessive modulation. Accordingly, an operator would be given two signals for guidance in controlling the system.

In addition to the modulation indications for control purposes as considered above, the system may incorporate self correcting action when operated with the switch 32 closed. Upon closure of the switch 32 the peak signal pulses passed by the threshold circuit 22 are integrated (by the integrator 34) into a smoothly-varying signal which is inverted into a negative form by the polarity inverter 38 and applied to the gain control of the amplifier 12 through the resistor 40. The amplifier 12 has a positive gain control with the result that after the variable resistor 44 is adjusted to establish the desired gain control, should over modulation occur, the negative signal from the polarity inverter 38 will reduce the gain of the amplifier 12 thereby reducing the drive signal to the frequency modulator 16 and halt the over modulation. When the over modulation ceases to occur, the output of the threshold circuit 22 becomes null with the result that the negative signal ceases to be applied from the polarity inverter 38 to reduce the gain of the amplifier 12. Accordingly, a servo control is accomplished whereby the applied signal fully drives the modulator 16; however, over modulation is avoided. Consequently, an automatic modulation control (AMC) system is accomplished.

As indicated above, the signal systems 30 and 36 may take various forms to provide different forms of signals, including audible or visual indications. One specific consideration is associated with the fact that the pulses passed by the threshold circuits 22 and 28 may be of exceedingly short duration. Accordingly, rather special forms of signal systems may be provided to alter pulses that drive signal devices, examples of which will now be considered.

Figure 3:
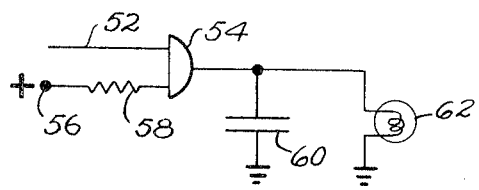
FIG. 3 is a block and schematic diagram showing a portion of the system of FIG. 1 in greater detail.

Referring to FIG. 3, one form of signal system is disclosed wherein the actuating pulses are received by a conductor 52 for application to an "and" gate 54 along with a positive potential which is supplied from a terminal 56 through a resistor 58. During the brief interval when a pulse is received through the conductor 52, the gate 54 is qualified to supply energy from the terminal 56 which charges a capacitor 60 that is connected in parallel relationship with a lamp 62. By providing a relatively low value for the resistance 58, the capacitor 60 is fully charged in a very short interval, to discharge through the higher-resistance lamp 62 over a prolonged interval. Of course, by varying the specific values involved in the components of the circuit of FIG. 3 varying affects can be accomplished. Specifically, for example, it may be desirable to variously elongate the duration that the lamp 62 is energized by specific pulses that qualify the "and" gate 54.

Figure 4:
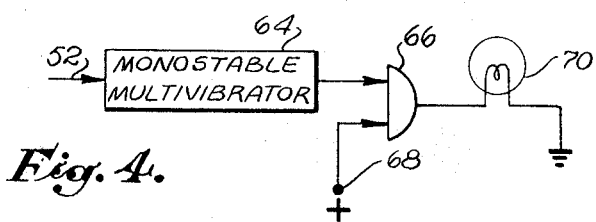
FIG. 4 is a schematic and block diagram showing an alternate form of a portion of the system of FIG. 1.

Another form of signal system is shown in FIG. 4 and includes a monostable-multivibrator 64, as well known in the prior art, which is connected to be actuated by a signal received through a conductor 52, similar to that previously identified. The output from the monostable-multivibrator is applied to an "and" gate 66, which is also connected to a source of electrical energy through a terminal 68. Accordingly in the operation of the system, a pulse of very brief duration is sufficient to actuate the monostable-multivibrator 64 and qualify the gate 66 for a predetermined interval of time. During such qualification of the gate 66, current from the terminal 68 passes to energize a lamp 70 for a visual indication. The circuit of FIG. 4 may be variously designed, most specifically in relation to the period or interval of the multivibrator 64. Of course, the circuits as disclosed in each of the FIGURES are merely illustrative and in that sense the entire system as disclosed herein is subject to many different possible design considerations.

We claim:

1. A frequency modulation control system comprising:
   frequency modulator means for providing a frequency-modulated intelligence signal;
   detector means for receiving said frequency-modulated intelligence signal, to derive an amplitude varying signal bearing the intelligence of said frequency modulated intelligence signal;

threshold means connected to receive said amplitude varying signal for passing portions thereof as an output signal which portions exceed a predetermined level of amplitude, for said amplitude-varying signal; and correction means connected to receive said output signal for manifesting the degree modulation in said frequency-modulated intelligence signal and including means for integrating said output signal to provide a control signal; control means for receiving said control signal to control said frequency modulator means for providing a frequency-modulated intelligence signal.

2. A system according to claim 1 wherein said means for providing a frequency-modulated intelligence signal comprises a variable-gain amplifier and a frequency modulator connected to be driven by said amplifier.

3. A system according to claim 1 further including recording means for recording said frequency-modulated intelligence signal.

4. A system according to claim 2 wherein said correction means further comprises a humanly perceivable signal means for manifesting excessive modulation in said frequency-modulated intelligence signal.

* * * * *